United States Patent
Bean et al.

(10) Patent No.: US 7,023,475 B2
(45) Date of Patent: Apr. 4, 2006

(54) SYSTEM AND METHOD FOR IDENTIFYING AN OBJECT WITH CAPTURED IMAGES

(75) Inventors: Heather Noel Bean, Ft. Collins, CO (US); Mark Nelson Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 649 days.

(21) Appl. No.: 10/118,564

(22) Filed: Apr. 8, 2002

(65) Prior Publication Data

US 2003/0189646 A1 Oct. 9, 2003

(51) Int. Cl.
*H04N 5/225* (2006.01)

(52) U.S. Cl. .................................. 348/207.99; 348/239

(58) Field of Classification Search ........... 348/207.99, 348/239, 148, 149, 143, 231.99, 231.3, 231.6, 348/231.7, 231.9; 382/100, 105, 115, 117, 382/125, 130, 116, 118
See application file for complete search history.

(56) References Cited

U.S. PATENT DOCUMENTS

| | | | |
|---|---|---|---|
| 6,404,902 B1 * | 6/2002 | Takano et al. | 382/105 |
| 6,532,039 B1 * | 3/2003 | Anderson | 348/231.3 |
| 6,546,119 B1 * | 4/2003 | Ciolli et al. | 382/104 |
| 6,690,294 B1 * | 2/2004 | Zierden | 348/148 |
| 6,747,687 B1 * | 6/2004 | Alves | 348/148 |
| 6,754,369 B1 * | 6/2004 | Sazawa | 382/105 |
| 2003/0123696 A1 * | 7/2003 | Matsumoto et al. | 382/100 |
| 2003/0133614 A1 * | 7/2003 | Robins et al. | 348/143 |

* cited by examiner

*Primary Examiner*—Aung Moe (57) ABSTRACT

One embodiment of the present invention provides a system and method for identifying objects with captured images. One embodiment of the present invention is a method comprising the steps of actuating a controller configured to cause an image capture device to operate in a property identification (ID) mode; capturing an image of an object, thereby generating an object image when the image capture device is operating in the property ID mode; and capturing at least one high-resolution image of a unique feature of the object, thereby generating at least one identification (ID) image when the image capture device is operating in the property ID mode.

30 Claims, 6 Drawing Sheets

SYSTEM AND METHOD FOR IDENTIFYING AN OBJECT WITH CAPTURED IMAGES

TECHNICAL FIELD

The present invention is generally related to digital image technology. More particularly, the present invention is directed to identifying objects with captured images.

BACKGROUND OF THE INVENTION

Digitally based image capturing devices capture images of objects. The captured image or "photograph" of an object is stored in a digital data format in the memory within, or coupled to, the image capturing device. Nonlimiting examples of a digital image capturing device is a digital camera that captures still images and/or video images, a facsimile machine (FAX) or a copy machine.

It is desirable to identify an object by capturing an image of the object. However, merely capturing an image of the object may not be adequate to identify the object with reliability or certainty because sufficient detail necessary to identify the object is not visible in the captured image. That is, a captured image of an object, particularly if the object is relatively large, will not have sufficient resolution to identify the object with reliability or certainty.

For example, the owner of a bicycle may capture an image of the bicycle believing the captured image is sufficient to identify the bicycle. In the event that the bicycle is lost, stolen or otherwise damaged such that the owner files an insurance claim, the insurance company may require further proof that the bicycle shown in the captured image is the insured property. It is possible that an unscrupulous owner could attempt fraud on the insurance company by substituting an image of a more expensive bicycle for the actual owned bicycle. Accordingly, the insurance company may require additional proof, such as a receipt showing the make, type and/or serial number of the bicycle. Even with a sales receipt, the captured image may not be sufficient proof that the bicycle corresponds to the bicycle documented by the sales receipt.

Furthermore, the insurance company may require proof of the condition of the property. For example, was the bicycle in "like-new" condition, or did the bicycle have damage such that the value of the bicycle would be devalued accordingly? Such issues regarding the condition of an insured object become even more important with more valuable objects, such as, but not limited to, automobiles, objects of art or historical documents. Thus, captured images of an object may be used to establish the value of the object.

Additionally, in instances of theft, the owner of an object may wish to provide images of the stolen object in addition to a verbal and/or written description to the authorities. For example, a stolen bicycle may have identifying marks (such as a serial number) and/or identifying features (such as a scratch or weld) that can aid authorities in reporting and/or identifying the stolen bicycle. For instance, if the bicycle is recovered by the authorities, such captured images would be important in identifying the owner's bicycle from the many hundreds, or even thousands, of bicycles recovered by the authorities. However, such captured image(s) do not provide sufficient detail of the owner's bicycle so that the owner's bicycle can be distinguished between other similar bicycles of the same make, model and/or color.

Creating an accurate and complete catalogue of captured images for objects of interest may a time consuming, tedious and expensive process if many objects are to be documented with captured images. Furthermore, multiple images of the same object may become dissociated with each other, making the process of retrieving a plurality of captured images for any one object more difficult.

SUMMARY OF THE INVENTION

The present invention provides a system and method for identifying objects with captured images. One embodiment of the present invention is a method comprising the steps of actuating a controller configured to cause an image capture device to operate in a property identification (ID) mode when the controller is actuated; capturing an image of an object, thereby generating an object image when the image capture device is operating in the property ID mode; and capturing at least one high-resolution image of a unique feature of the object, thereby generating at least one identification (ID) image when the image capture device is operating in the property ID mode.

Another embodiment of the present invention is a processing system comprising a processing system configured to interface with an image capture device memory such that an image of an object and at least one high-resolution image of a unique feature of the object is received from the image capture device; a processor configured to generate an object image from the received object image, configured to generate an ID image from the received at least one high-resolution image, and further configured to associate the object image and the at least one ID image, thereby generating an object group such that the object group has a plurality of associated images that identify the object; and a memory configured to store at least the object group.

BRIEF DESCRIPTION OF THE DRAWINGS

The components in the drawings are not necessarily to scale relative to each other. Like reference numerals designate corresponding parts throughout the several views.

FIG. 6 is a flow chart of a process describing an alternative embodiment of the object identification system implemented in a processing device, such as, but not limited to, personal computer, a FAX machine, a copy machine or the like.

DETAILED DESCRIPTION OF THE PREFERRED EMBODIMENT

The present invention provides a system and method for identifying an object with captured images. A plurality of captured images are associated with each other. Preferably, one image is a perspective image of the entire object, or a large portion of the object, and other ones of the associated captured images are close-up captured images of selected identifiable features of the object. Thus, the present invention associates at least one captured image of the object with one or more close-up images showing a unique feature of the object (with sufficient resolution to identify the unique feature) so that the object of interest can be identified with reliability and certainty.

Figure 1:
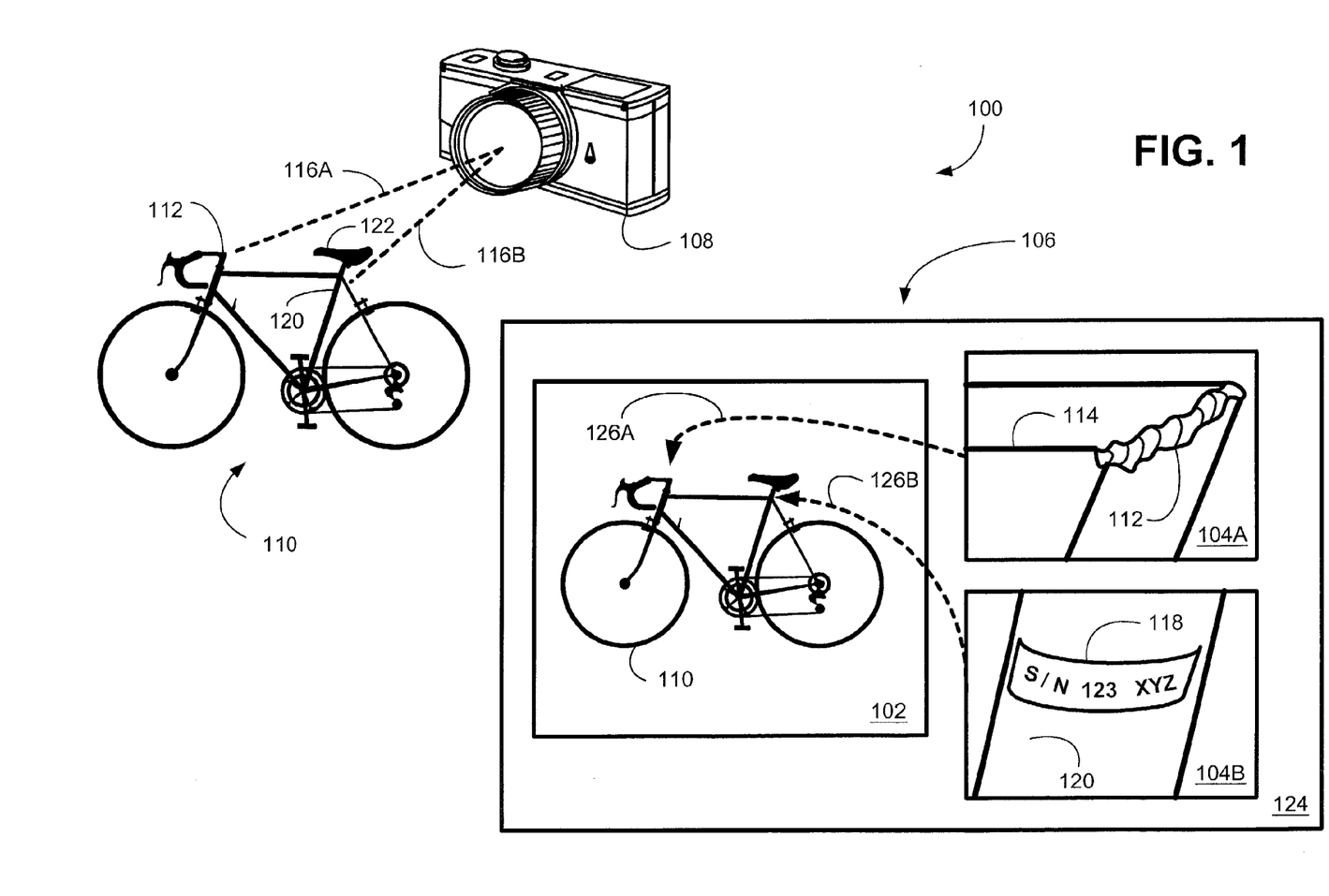
FIG. 1 is a block diagram of one embodiment of an object identification system according to the present invention.

FIG. 1 is a block diagram of one embodiment of an object identification system 100 according to the present invention illustrating an object image 102, two identification (ID) images 104A, 104B, and an object group 106. Images are captured by digital camera 108, described in greater detail below. For illustrative purposes, a bicycle 110 is illustrated as the intended object of interest.

An image of bicycle 110 is captured, referred to hereinafter as an object image 102. At least one close-up image of a unique feature of bicycle 110, referred to hereinafter as an ID image 104, is captured. The object identification system 100 associates the object image 102 and one or more ID images 104 such that an object group 106 is generated.

For convenience, one embodiment of object identification system 100 is described as being implemented in, or being a part of, a digital camera 108. The present invention is equally applicable in any electronic device configured to capture images of the object such as, but not limited to, a facsimile machine (FAX), a scanner or a copy machine.

Another embodiment of object identification system 100 is implemented in a processing device, described in greater detail below, that is configured to receive previously captured object images and/or ID images from a memory such that the received plurality of captured images are used to generate an object group 106. Accordingly, such an embodiment is implemented without an image capture device.

As illustrated in FIG. 1, the object of interest is recognized as a bicycle 110. The object of interest may be any object that an individual wishes to create an object group 106 in accordance with the present invention. Examples of objects include, but are not limited to, people, pets, bicycles, automobiles, objects of art, historical artifacts, or documents.

Accordingly, digital camera 108 captures an image of bicycle 110, referred to as an object image 102. Object image 102 preferably is a perspective view of the object of interest showing general features of bicycle 110, such as large structural features and/or color. However, the object image 102 alone is not sufficient to positively identify the bicycle 110 from other similar bicycles because object image 102 is preferably a low-resolution image that does not show identifying features of the object with sufficient resolution.

Accordingly, the user of the digital camera 108 selects at least one unique feature of the bicycle 110 and captures a close-up image of the selected unique feature. Preferably, the unique feature is captured using a high-resolution image capture setting, referred to herein as a close-up, such that the selected unique feature can be viewed with sufficient resolution to positively identify the unique feature and to differentiate the unique feature from similar features on different objects. This close-up image is referred to herein as an ID image.

For convenience, a close-up image of a weld 112 on the handlebar 114 of the bicycle 110 is illustrated as ID image 104A. Thus, the user of the digital camera 108 sights along the path 116A and captures a close-up image of the weld 112.

Similar bicycles would also have a similar weld. However, each weld is unique because of the very nature by which a weld is formed. Accordingly, the ID image 104A has sufficient resolution to show the unique features of weld 112, thereby identifying weld 112 from all other welds. Since the object identification system 100 associates ID image 104A with object image 102, as described in greater detail below, bicycle 110 can be positively identified by the close-up image of weld 112 (ID image 104A).

The path 116A may be different from the image capture path used in capturing the object image 102. For example, the object image 102 is a side view of the bicycle 110, implying that the image capture path was perpendicular to the side of bicycle 110. The image of the weld 112, captured from an orientation illustrated by path 116A, demonstrates that the image of the weld 112 was captured when the digital camera 108 was located behind and slightly above the bicycle 110. Accordingly, the user of the digital camera 108 may select any suitable orientation and/or location of the camera 108 such that the selected unique feature is captured with sufficient resolution.

To more positively identify the object, additional ID images of the object may be captured and associated with the object in accordance with the present invention. For example, an ID image 104B of the serial number plate 118 residing on the bicycle frame 120 is captured with sufficient resolution such that the serial number 123 XYZ is visible. For convenience, serial number plate 118 is illustrated on the bicycle frame 120 just below the bicycle seat 122. Other bicycles have similar serial number plates, but each bicycle has a unique serial number. Accordingly, the exemplary serial number 123 XYZ positively identifies bicycle 110 because the object identification system 100 has associated ID image 104B with object image 102. Furthermore, the path 116B may be different from the path used in capturing the object image 102 and/or the path 116A used in capturing the ID image 104A.

One embodiment of the object identification system 100 formats the object image 102 and ID image and/or 104B into image group 106. Image group 106 may be conveniently displayed as a composite image 124 showing an object image and one or more ID images. For convenience, composite image 124 is illustrated as having object image 102, ID image 104A of the weld 112, and ID image 104B of the serial number plate 118. The composite image 124 can be viewed on a display and/or printed. If a plurality of ID images of the object are available in an object group, one embodiment of the object identification system 100 enables a user to select which ID images are displayed with the object image. Another embodiment allows a plurality of object images to be included in an object group such that a particular object image of interest may be selected for the composite image 124. Yet another embodiment of composite page 124 employs a page of image thumbnails (small, low-resolution images) of the object images and the ID images such that selected thumbnails are selected for viewing.

The relative size of he object image 102 and ID images 104A, 104B are shown on composite image 124 for illustrative purposes only. The relative size of object images and ID images may be defined according to the identification needs of a particular object of interest. For example, the ID images may be larger than the object image to more easily and clearly show the unique features captured in the ID image. One embodiment is configured to allow the user to define the size of object images and ID images shown on a composite image.

Another embodiment of an object identification system 100 associates the object image(s) with the ID images(s) by including an association code in the header information of the images. Yet another embodiment associates the object image(s) with the ID images(s) by embedding the ID images (s) into the object images(s) as a watermark or the like. Yet another embodiment associates the object image(s) with the ID images(s) by including an association code as part of the image file name, image title, and/or image caption. It is intended that the object identification system 100 may be implemented using any suitable association system or method that associates at least one object image with at least one ID image.

Another embodiment preferably includes a location pointer on the composite image 124 to indicate the location of the ID image on the object. For example, but not limited, the location pointer may be an arrow or the like. FIG. 1 illustrates location pointer 126A as a dashed line with an arrowhead, such that the arrowhead of pointer line 126A indicates the location of weld 112 (shown in ID image 104A) on bicycle 110. Similarly, location pointer 126B indicates the location of the serial number plate 118 (shown in ID image 104B).

Other exemplary location pointers include, but are not limited to, other formatted line types with or without arrowheads, by circles, by shaded and/or by colored regions, or by multiple lines symbolic of magnification. Accordingly, a viewer of a composite image generated in accordance with the present invention easily understands the location of the identifying, unique feature of the object by associating an ID image, a location pointer and an object image.

Figure 2:
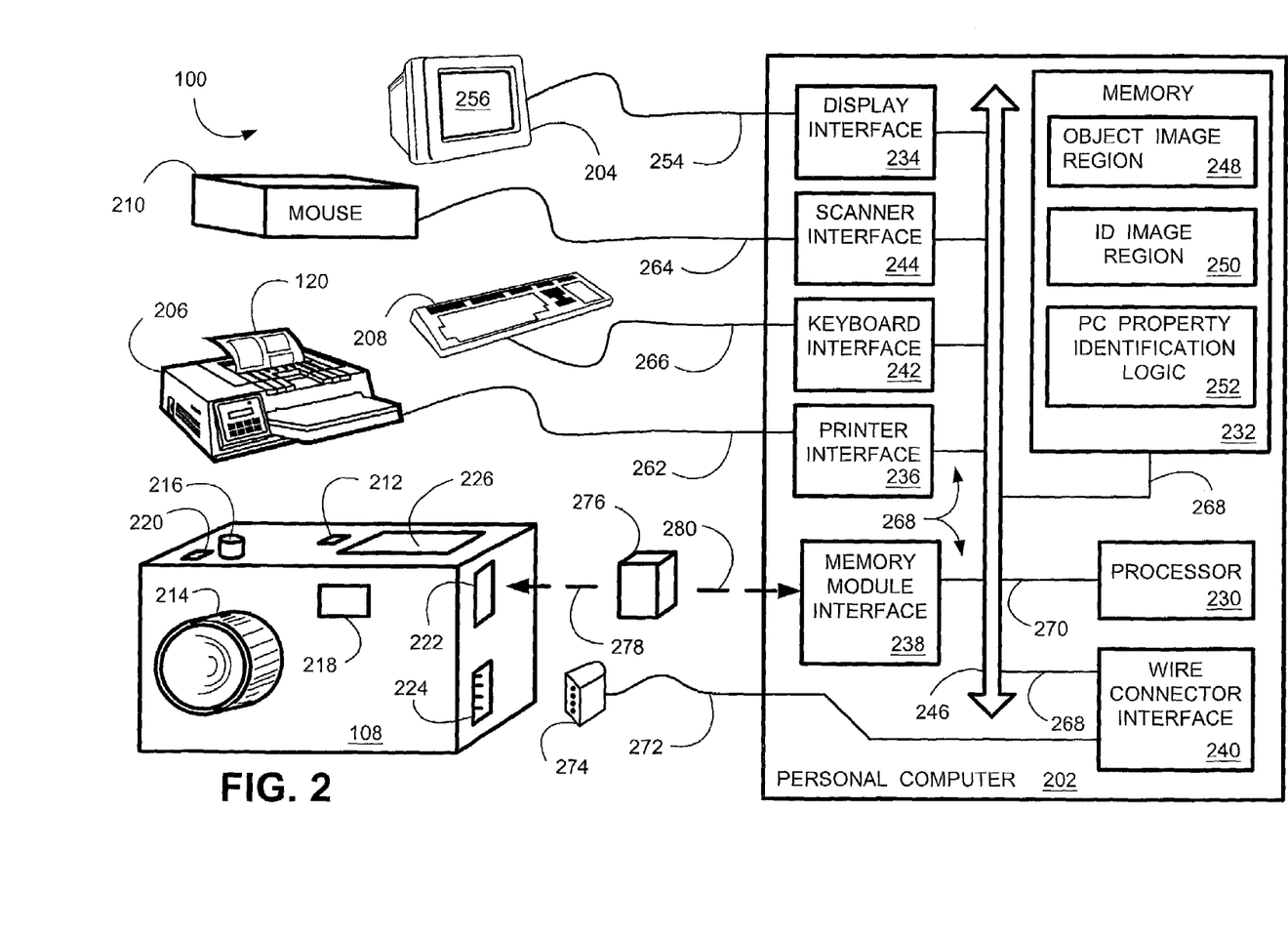
FIG. 2 is a block diagram illustrating one embodiment of an object identification system in accordance with the present invention having at least a digital camera, a personal computer, a display, a printing device, a user interface device (keyboard) and a mouse.

FIG. 2 is a block diagram illustrating another embodiment of an object identification system 100 in accordance with the present invention having at least a digital camera 108, a personal computer 202, a display 204, a printing device 206, a user interface device 208 (keyboard) and a mouse 210. Other embodiments of an object identification system 100 may have more, or may have fewer components, or may have different components, so long as the object identification system 100 associates at least one object image with one or more ID images such that the object can be identified with reliability and certainty.

Digital camera 108 includes at least a control button 212, a lens unit 214, an image capture actuation button 216, a viewing lens 218, a power switch 220, memory unit interface 222, a plug-in interface 224 and display 226. Display 226 is used for previewing images prior to capturing or for viewing captured images. For convenience of illustration, display 226 is illustrated on the top of digital camera 108.

FIG. 2 further illustrates a personal computer 202 that is employed with digital camera 108 such that digital images captured by the digital camera 108 are retrieved, processed, viewed and/or printed in accordance with the present invention. Personal computer 202 include at least a processor 230, a memory 232, a display interface 234, a printer interface 236, a memory module interface 238, a wire connector interface 240, a keyboard interface 242, a mouse interface 244 and a communication bus 246. Memory 232 further includes at least an object image region 248 where at least one object image resides, an ID image region 250 where at least one ID image resides, and personal computer (PC) property identification logic 252 resides. The object image region 248, ID image region 250 and PD property identification logic 252 are described in greater detail below. Memory 232 may also contain other data, logic and/or information used in the operation of personal computer 202, however such data, logic and/or information are described herein only to the extent necessary to describe the present invention.

Personal computer 202 is illustrated as being coupled to a display 204, via connection 254, so that composite image 120 prepared in accordance with the present invention can be viewed on display screen 256. Personal computer 202 is further illustrated as being coupled to printer 206, via connection 262, so that composite image 120 is printed. Personal computer 202 is illustrated as being coupled to mouse 210, via connection 264, so that a location pointer is defined in one embodiment, as described in greater detail below. Also, personal computer 202 is illustrated as being coupled to keyboard 208, via connection 266, so that a user can provide instructions for the operation of personal computer 202.

Memory 232, display interface 234, printer interface 236, memory module interface 238, wire connector interface 240, keyboard interface 242 and mouse interface 244 are coupled to communication bus 246 via connections 268. Communication bus 246 is coupled to processor 230 via connection 270, thereby providing connectivity to the above-described components. In alternative embodiments of personal computer 220, the above-described components are connectivley coupled to processor 230 in a different manner than illustrated in FIG. 2. For example, one or more of the above-described components may be directly coupled to processor 230 or may be coupled to processor 230 via intermediary components (not shown).

In one embodiment of digital camera 108, digital camera 108 transfers captured object images and ID images to personal computer 202 via a hard wire connection 272. Connection 272 is coupled to a plug-in attachment 274. Plug-in attachment 274 is configured to connect to plug-in interface 224. The user connects plug-in attachment 274 to plug-in interface 224, thereby establishing connectivity between digital camera 108 and personal computer 202. The user then instructs personal computer 202 and/or digital camera 108 to transfer digital captured object images and ID images from digital camera 108 into object image region 248 and ID image region 250, respectively. An alternative embodiment is configured to receive captured images of an object and identifying features from other types of image capture devices, such as, but not limited to, a FAX machine, a scanner or copy machine, or the like.

In another embodiment, captured object images and ID images are stored in memory module unit 276. When capturing images with digital camera 108, memory module unit 276 is coupled to digital camera 108 through memory unit interface 222, as illustrated by dashed line path 278. Captured object images and ID images are transferred to personal computer 202 by removing memory module unit 276 from digital camera 108 and coupling memory module unit 276 to memory module interface 238. Typically, a convenient coupling port or interface (not shown) is provided on the surface of personal computer 202 such that memory module unit 276 is directly coupled to personal computer 202, as illustrated by dashed line path 280. Once memory module unit 276 is coupled to memory module interface 238, captured object images and ID images are transferred into object image region 248 and ID image region 250, respectively. An alternative embodiment configured to capture images of the objects and identifying features communicates object images and ID images to a suitable location in memory 232 in a similar manner.

Yet another embodiment is configured to retrieve for processing images directly form the image capture device or another suitable memory. Accordingly, such an embodiment does not employ an object region 248 or ID image region 250. For example, but not limited to, object images and ID images could be downloaded remotely from the Internet, a cable or other wire system, a wireless system, OC telephone system, or the like.

A variety of means for receiving captured images described above were implemented in one embodiment of an object identification system 100. Preferably, an object identification system 100 is configured to receive captured images using one or more of the above described receiving means. One embodiment employs all of the above described means of receiving captured images.

For convenience, personal computer 202 is illustrated as having only selected components of interest. However, personal computer 202 may include additional internal components that are not illustrated in FIG. 2. These additional components are not shown and are not described in detail herein other than to the extent necessary to understand the present invention.

Figure 3:
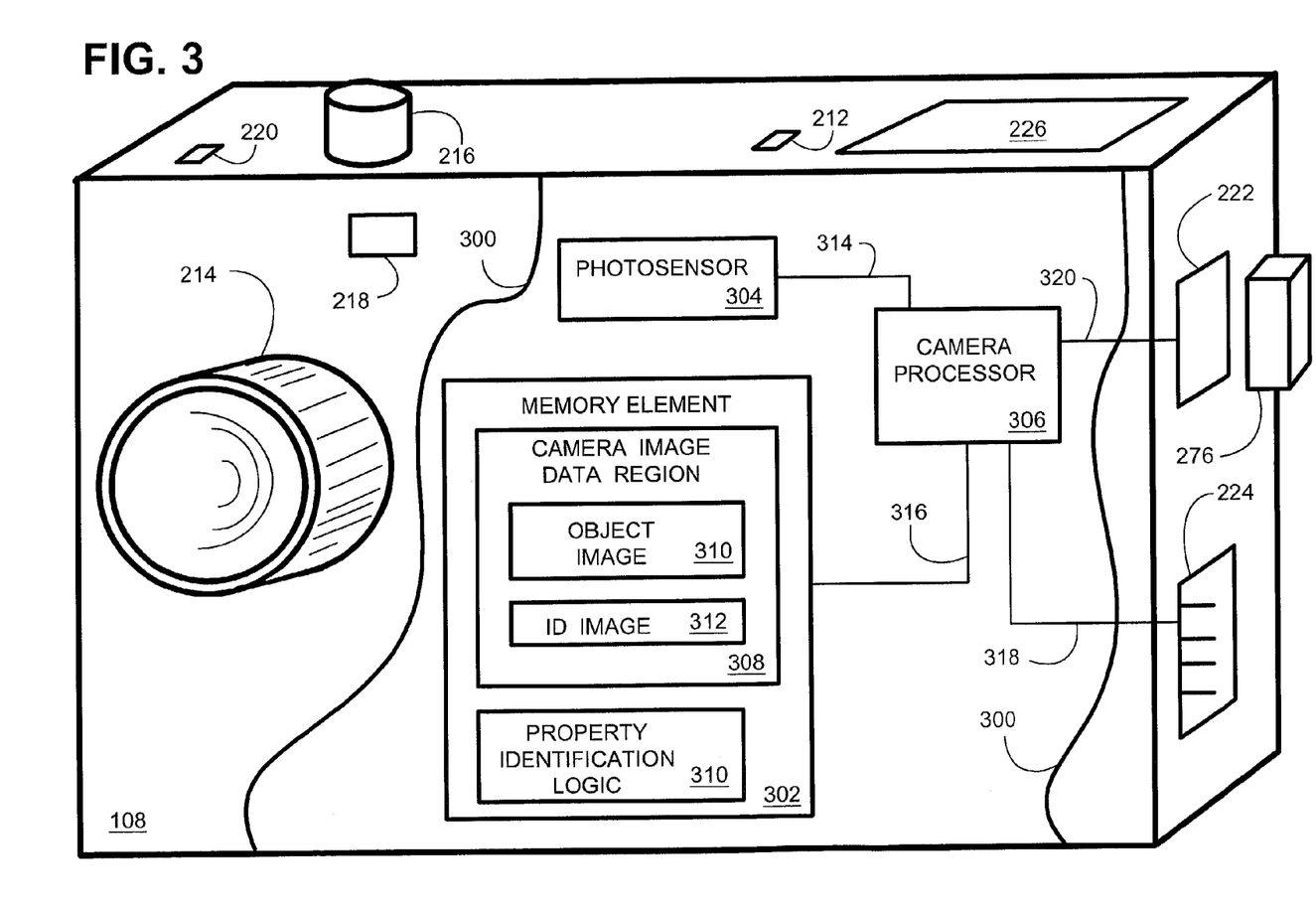
FIG. 3 is a block diagram of selected components of an embodiment of a digital camera according to the present invention.

FIG. 3 is a block diagram of selected components of an embodiment of an object identification system implemented in a digital camera 108 according to the present invention. FIG. 3 includes selected external and internal components of the digital camera 108, demarked by cut-away lines 300. The internal components include at least memory element 302, photosensor 304 and camera processor 306. In one embodiment, memory element 302 further includes a camera image data region 308 configured to store at least one object image 310 and at least one ID image 312.

Operation of the digital camera 108 is initiated by actuation of the power switch 220 or an equivalent device having the same functionality. Display 226 may display a view of an image currently visible through the lens unit 214 and detected by photosensor 304, referred to herein as a preview image. When digital camera 108 is displaying a preview image, digital camera 108 is referred to herein as operating in a preview mode.

Alternatively, an image of a previously captured image may be viewed on display 226. When digital camera 108 is displaying a previously captured image, digital camera 108 is referred to herein as operating in a review mode. Furthermore, a menu screen may be displayed on display 226. In one embodiment, other buttons, switches or control interface devices (not shown) are additionally configured to operate display 226 such that menu items may be selected.

Prior to capturing an image of on object of interest or of an identifying feature, the operator of the digital camera 108 may visually preview the image of the object and/or the image of the identifying feature on display 226. Or, the image of the object and/or the image of the identifying feature may be viewed directly through the viewing lens 218. Photosensor 304 is disposed in a suitable location behind lens unit 214 such that an image of the object and/or the image of the identifying feature is focused onto photosensor 304 for capturing. When the operator has focused the image of the object and/or the image of the identifying feature and is satisfied with the focused image, the operator actuates the image capture actuation button 216 (also referred to as a shutter button or a shutter release button) to cause digital camera 108 to capture the image of the object and/or the image of the identifying feature, thus "photographing" the object and/or the identifying feature. Photosensor 304 detects the image of the object and/or the image of the identifying feature through lens unit 214 and communicates digital image data corresponding to the detected image to the camera processor 306, via connection 314.

In one embodiment, the digital image data corresponding to the captured image is communicated to the memory element 302, via connection 316. In accordance with the present invention, when an image of the object of interest is captured, the digital image data corresponding to the image of the object is stored in the camera image data region 308 as an object image 310. Similarly when an image of an identifying feature is captured, digital image data corresponding to the image of the identifying feature is stored in the camera image data region 308 as an ID image 312.

Control button 212, in one embodiment, is used to indicate whether the captured image corresponds to the object or corresponds to the identifying feature. Alternative embodiments employ other suitable devices or a menu to indicate that the captured image corresponds to the object or the identifying feature.

Accordingly, the camera image data region 308 is configured to store many object images 310 and/or ID images 312. In an embodiment employing hard wire connection 272 to communicate captured images to personal computer 202, object image 310 and ID image 312 are communicated from the digital camera 108 to the hard wire connection 272 over connection 316, connection 318 and plug-in interface 224.

In another embodiment, digital image data is transferred to the memory module unit 276. When capturing images with digital camera 108, memory module unit 276 is coupled to digital camera 108 through the memory unit interface 222. As the user of digital camera 108 actuates the image capture actuation button 216 to cause the camera processor 306 to capture the current image detected by photosensor 304, camera processor 306 communicates the digital image data to the memory module unit 276, via connection 320 and the memory unit interface 222. Accordingly, memory module unit 276 is configured to store many object images and/or ID images.

For convenience, digital camera 108 is described above as employing both a camera image data region 308 and a memory module unit 276 to store captured object images and/or ID images. Preferably, digital camera 108 would, in practice, employ either the memory element 308 or the memory module unit 276 to store captured images because employing two different and separate memory systems would be inefficient and costly. (However, it is possible some embodiments of a digital camera 108 could employ both a camera image data region 308 and a memory module unit 276.)

FIGS. 4A–4D are block diagrams that illustrate a series of images demonstrating the operation of one embodiment of an object identification system 100 implemented in digital camera 108 (FIG. 3). Accordingly, the series of images of 20 FIGS. 4A–4D are understood to be images shown on display 226. Alternatively, the images could also represent a view of the object through viewing lens 218.

Figure 4A:
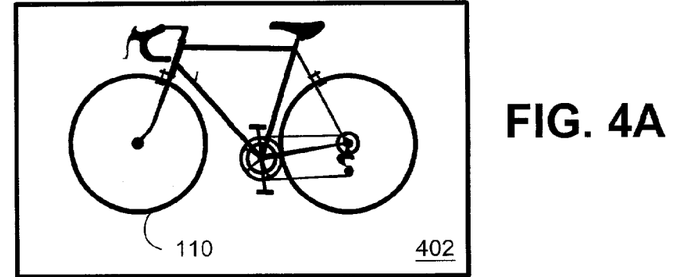
FIGS. 4A–4D are block diagrams illustrate a series of images demonstrating the operation of an embodiment of an object identification system implemented in digital camera or a processing device.

FIG. 4A represents a view 402 of the object of interest, bicycle 110, when the digital camera 108 is operated in a preview mode. Accordingly, the operator captures an image of bicycle 110 when the user is satisfied with the framing of the image of the bicycle 110 within the image capture region of digital camera 108 as described above. Once the image of bicycle 110 is captured, an object image 102 (FIG. 1) is generated. When the captured image is specified to be a perspective view of the object of interest. Another embodiment is configured such that the captured image is defined as an object image at a later time.

Figure 4B:
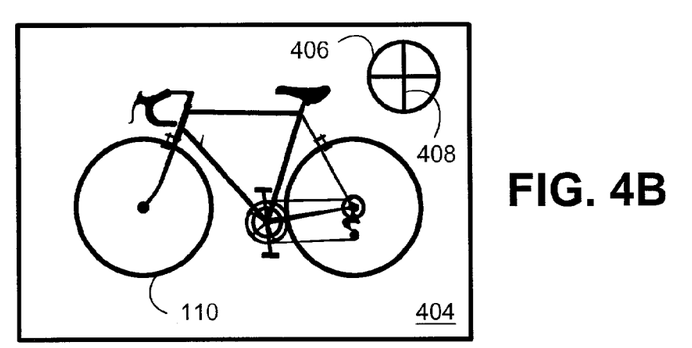

FIG. 4B represents a view 404 of the object image 102 when the digital camera 108 is operated in a review mode. Included in the view 404 is a target icon 406, illustrated for convenience as a circle with cross-hairs 408. The cross-hairs 408 indicate where the above-described location of an ID image on the object of interest will be defined. Target icon 406 is initially displayed at a suitable location within the field of view 404. For convenience, the initial position of target icon 406 is in the upper right-hand corner of view 404.

Figure 4C:
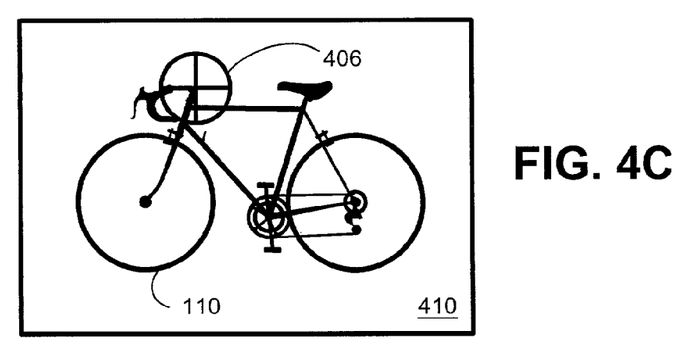

FIG. 4C represents a view 410 of the object image 102 when the location of digital target icon 406 has been changed to indicate the location of an ID image. Accordingly, it is understood that the user has repositioned the target icon 406 to the desired location on view 410. Here, the target icon 406 has been positioned over the handlebar 114 of bicycle 110. Once target icon 406 is positioned to identify the location of an ID image, control button 212, or another suitable controller, is actuated to define the location of the ID image on the object.

The target icon 406 may be positioned using any suitable control interface device (controller). For example, but not limited to, control button 212 is configured to provide for the repositioning of target icon 408 in addition to causing the image capture device to operate in the object ID mode. In another embodiment, separate control interface devices are employed to cause the image capture device to operate in the object ID mode and to control the repositioning of target icon 408. In yet another embodiment, a menu system is used to position target icon 406. Any suitable means for positioning target icon 406 may be used in the present invention such that the relative location of an ID image on an object image is specified.

Figure 4D:
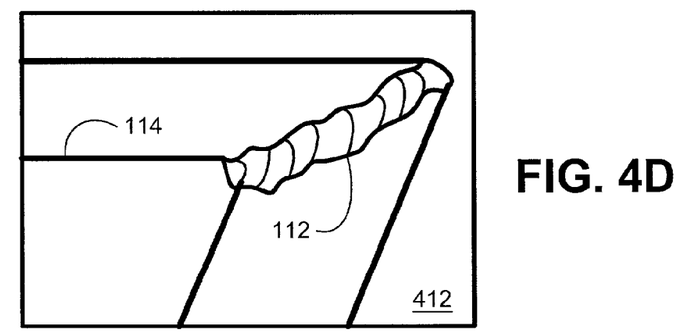

FIG. 4D represents a view 412 of a close-up of the area of the object of interest specified by target icon 406 when the digital camera 108 is operated in a preview mode such that the identifying feature is displayed. For convenience, the target icon 406 in FIG. 4C was described as defining the location of an ID image on or near the handlebar 114 of bicycle 110. Accordingly, view 412 is illustrated as a close-up image of the handlebar 114 showing weld 112 with sufficient resolution so that weld 112 can be differentiated from other similar welds, as described above. When the user is satisfied with the framing of the image of the weld 112 within the image capture region of digital camera 108, the image of weld 112 is captured, thereby generating ID image 104A (FIG. 1). ID image 104A is then associated with object image 102 as described above to create an object group.

In one embodiment, after the target icon 408 defines a location, the next captured image is understood to be the ID image whose location on the object of interest is defined by the location of target icon 406. In another embodiment, the previously captured image is understood to be the ID image. In yet another embodiment, the user retrieves an ID image from memory so that the target icon 406 is used to define the location of the ID image.

Any suitable image may be used for the target icon 406 so long as the location of an ID image on an object is specified with sufficient accuracy. For example, but not limited to, target icon 408 could alternatively resemble a pointer, an arrow, a box, a circle, a star, a point or any other suitable symbol. Furthermore, the target icon 406 may be colored to more easily allow differentiation between the target icon 406 and the image of the object of interest.

FIGS. 4A–4D are also understood illustrate a series of images demonstrating the operation of an embodiment of an object identification system 100 implemented in a processing device, such as, but not limited to, personal computer 202 (FIG. 2), a FAX machine, a scanner, a copy machine or the like. Accordingly, the series of images of FIGS. 4A–4D are understood to be images shown on display 204 when the processing device is operating in a property ID mode of operation. This embodiment is particularly suited to processing object images and ID images in accordance with the present invention when the object images and ID images are residing in memory 232 or in another suitable memory unit, as described herein. Alternatively, the object images and ID images could be received from a remote image capture device, such as a digital camera, a copy machine or a fax machine, and/or from a remote memory.

The operation of an object identification system 100 implemented in a processing device is substantially similar to the above-described embodiment of the invention implemented in digital camera 108. The positioning of target icon 408 is performed using any suitable controller device, such as, but not limited to, mouse 210, a cursor adjustment tool (pointer stick) incorporated into keyboard 208 or other suitable location, a track ball, palm ball, thumb-ball or the like, or any other suitable controller configured to adjust the position of target icon 408 such that the location of an ID image relative to an object is defined.

When digital camera 100 is in operation, camera processor 306 is configured to execute software stored within memory element 302, to communicate data to and from memory element 302, and to generally control operations of digital camera 100. Object images 310, ID images 312 and property identification logic 310, in whole or in part, are read by camera processor 306, and in one embodiment, are buffered within camera processor 306, and then executed.

When property identification logic 310 is implemented in software, it should be noted that property identification logic 310 can be stored on any computer readable medium for use by or in connection with any computer related system or method. Similarly, object images 310 and ID images 312 can be stored on any suitable computer readable medium.

Furthermore, when personal computer 202 is in operation, processor 230 is configured to execute software stored within memory 232, to communicate data to and from memory 232, and to generally control operations of personal computer 202. Object images stored in object image region 248, ID images stored in ID image region 250 and PC property identification logic 250, in whole or in part, are read and executed by processor 230. When PC property identification logic 252 is implemented in software, it should be noted that PC property identification logic 252 can be stored on any computer readable medium for use by or in connection with any computer related system or method. Similarly, object images stored in object image region 248 and ID images stored in ID image region 250 can be stored on any suitable computer readable medium.

The above-described computer readable medium may be the same medium or may be separate medium, and accordingly different medium, depending upon the specific architecture in which the present invention is implemented in. For example, but not limited to, the object image region 248, ID image region 250 and PC property identification logic 252 is illustrated in FIG. 2 as residing in a single memory unit, memory 232. In another embodiment, where a portable storage and/or remote storage media is desirable, object image region 248 and ID image region 250 reside in a separate memory media. In the embodiment of digital camera 108 described above employing memory module 276, the object image region 248 and ID image region 250 are understood to reside within the memory module 276 and the property identification logic 310 is understood to reside in memory element 302. The possible alternative embodiments of a object identification system 100 that employ multiple memory media of different types and configurations are limitless. For brevity, only selected embodiments have been described herein.

In the context of this document, a computer readable medium is an electronic, magnetic, optical, or other physical device or means that can contain or store a computer program for use by or in connection with a computer related system or method. The property identification system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic, compact flash card, secure digital card, or the like), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical).

In an alternative embodiment, where the object identification system 100 is implemented as firmware, as hardware or a combination of firmware and hardware, object identification system 100 can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
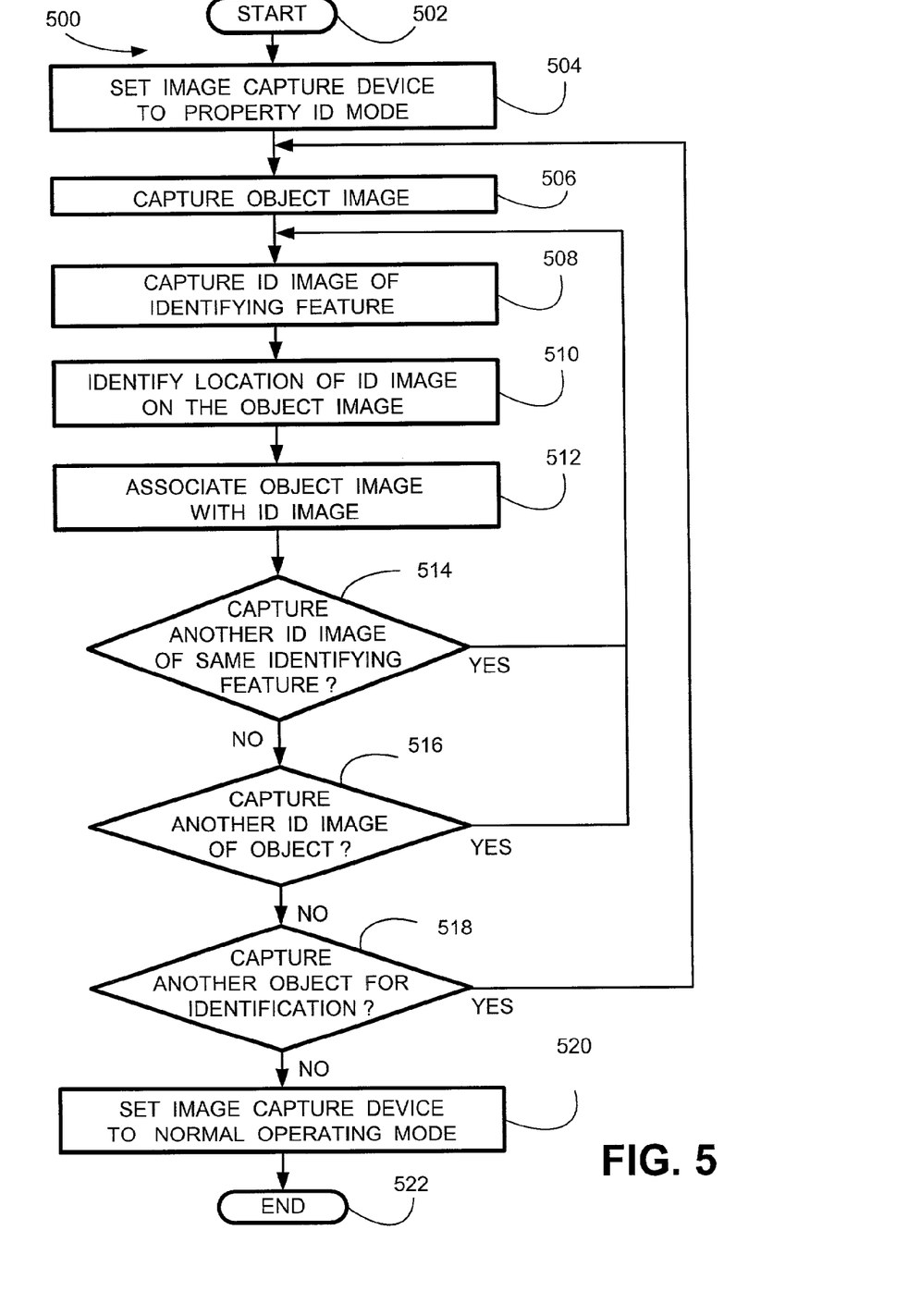
FIG. 5 is a flowchart of a process describing one embodiment of the object identification implemented in an image capture device, such as, but not limited to, a digital camera.

FIG. 5 is a flowchart 500 of a process describing one embodiment of the object identification system 100. Flowchart 500 shows the architecture, functionality, and operation of one implementation of object identification system 100 implemented in an image capture device, such as, but not limited to, digital camera 108. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in FIG. 5 may in fact be executed substantially concurrently or the blocks may sometimes be executed in the reverse order, depending upon the functionality involved, as will be further clarified hereinbelow.

The process starts at block 502. At block 504, the digital camera 108 is configured to capture at least one object image and one or more associated ID images according to the present invention, herein referred to as the property identification (ID) mode of operation. In one embodiment, digital camera 108 is set to operate in the property ID mode by actuation of control button 212. Alternative embodiments employ other suitable controller devices or systems to set the image capture device to operate in the property ID mode of operation.

At block 506, an image of an object of interest is captured. Preferably, the captured image of the object is a perspective view showing all of, or substantially all of, the object of interest. At block 508, an ID image of an identifying feature is captured. Preferably, the ID image is a close-up image of the identifying feature having sufficient resolution to positively identify and distinguish the identifying feature from similar features on other objects. At block 510, the location of the ID image on the object image is identified. As described above, one embodiment of a target icon 406 or other suitable point icon is displayed on the display 226 such that the location of the ID image can be specified. In one embodiment, actuation of control button 212 identifies the location of the ID image of an object image.

At block 512, the object image and the ID image are associated together, thereby generating an object group. At block 514, a determination is made whether another ID image of the same identifying feature is to be captured. If so (the YES condition), the process returns to block 508. If not (the NO condition), the process proceeds to block 516.

At block 516, a determination is made whether to capture another ID image of the object. If so (the YES condition), the process proceeds to block 508 such that a different identifying feature is captured. If not (the NO condition), the process proceeds to block 518. At block 518, a determination is made whether to capture another object for identification. If so (the YES condition), the process returns to block 506 such that one or more ID images and the new object image are captured and associated, thereby generating another object group.

If at block 518 no additional objects are to be captured for identification (the NO condition), the process proceeds to block 520 wherein the image capture device is set to return to a normal operating mode of operation. The process then ends at block 522. An alternative embodiment deactivates the image capture device at block 520.

Alternative embodiments implement blocks 506 through blocks 518 in different order. For example, but not limited to, an object image may be first captured, then the location of an ID image is specified, and then the next captured image is understood to be an ID image. It is understood that the process of capturing object images and ID images can be implemented in a variety of sequences without departing substantially from the present invention so long as an image of an object is captured (an object image) and one or more images of identifying features (ID images) are captured and associated together such that an object group is generated.

Figure 6:
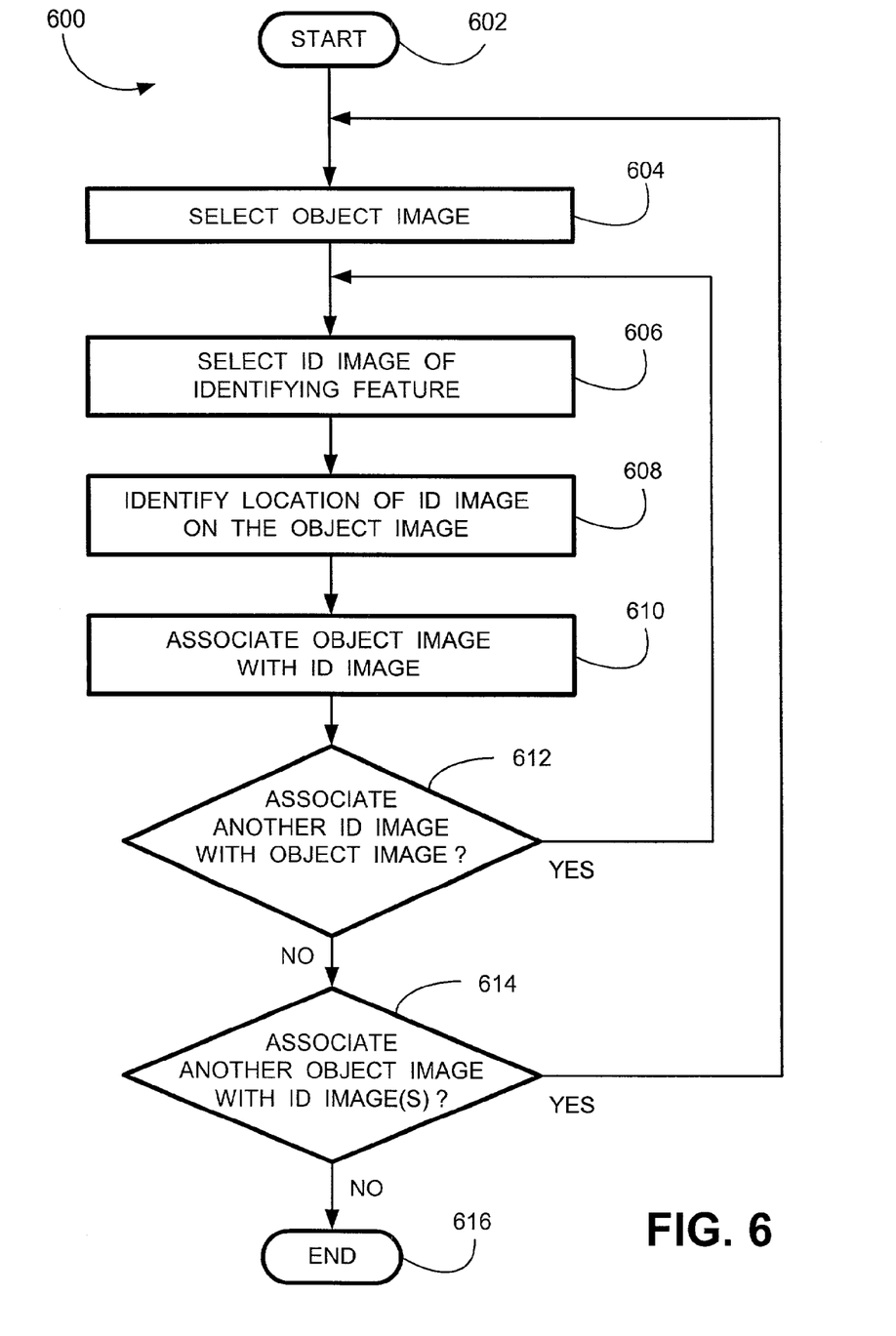

FIG. 6 is a flow chart 600 of a process describing an alternative embodiment of the object identification system 100. Flow chart 600 shows the architecture, functionality, and operation of one implementation of object identification system 100 implemented in a processing device, such as, but not limited to, personal computer 202, a FAX machine, a copy machine or the like. In this regard, each block represents a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved, as will be further clarified hereinbelow.

The process starts at block 602 when the processing device is operating in a property ID mode of operation. At block 604, an object image is specified. The specified object image may reside in the object image region 248, may reside in the memory module unit 276, or may reside as an object image 310 in digital camera 108. Accordingly, if the specified object image resides in the memory module unit 276 or digital camera 108, the memory module unit 276 or the digital camera 108 is coupled to the personal computer 202 as described above.

At block 606, an ID image of an identifying feature is specified. Similarly, the ID image may reside in the ID image region 250, in memory module unit 276, or as an ID image 312 residing in digital camera 202. At block 608, the location of the ID image on the object image is specified. As described above, one embodiment is configured to receive information from mouse 210 such that the positioning of a target icon 406 or other suitable pointer icon specifies the location of the ID image. At block 610, the object image and the ID image are associated, thereby generating an object group.

At block 612, a determination is made whether to associate another ID image with the current object image. If so (the YES condition), the process returns to block 606 such that another ID image is specified. If not (the NO condition), the process proceeds to block 614.

At block 614, a determination is made whether to associate another object image with one or more ID images. If so (the YES condition), the process returns to block 604 such that another object image is specified. If not (the NO condition) the process proceeds to block 616 and ends. In an embodiment of the object identification system 100 implemented in a personal computer 202, the ending of the process at block 616 returns the operation of the personal computer 202 to a normal mode of operation.

Once an object group has been generated by any of embodiments of the present invention described herein, the object group may be saved for future reference. The object group may be stored in any suitable memory media described herein. Such a memory may reside within or be coupled to the present invention, and/or communicated to a remote memory medium.

An embodiment of the present invention implemented in personal computer 202, or in another suitable processing device, a composite image 120 is generated. A composite image 120 may be printed by printer 206, or by another suitable printing device, thereby generating a hard-copy image. The hard-copy image may be stored in a suitable location, such as a safety deposit box or the like, and later retrieved when the object image requires identification. Or, the hard-copy image could be communicated to third parties via any suitable system, such as, but not limited to, through a mail service or through personal delivery.

Alternatively, once an object group has been generated by any of embodiments of the present invention described herein, the object group may be saved for future reference in any suitable electronic medium. For example, the object group may be saved onto a portable memory unit, such as, but not limited to, a floppy disk or a compact disk (CD). Referred to herein as a soft-copy, the soft-copy of the object group may be stored in a suitable location, such as a safety deposit box or the like, and later retrieved when the object group requires identification. Furthermore, the soft-copy of the object group could be communicated to third parties via any suitable electronic medium, such as, but not limited to, an e-mail system or wireless system. The soft-copy of the object group could even be communicated electronically to a remote storage medium.

The above-described embodiment of the object identification system 100 implemented in an image capture device, such as, but not limited to, digital camera 108, an operator of the image capture device captures at least one object image and separately captures at least one ID image. In an embodiment of an image capture device having sufficient image resolution, an object group is generated from a single captured image. A low-resolution image of the entire captured image (or a selected portion) is processed to generate a low-resolution object image, thereby facilitating future processing and/or printing time and memory storage requirements if the object group is stored electronically. Locations for the ID images are specified, and a portion of the captured image is processed to generate high-resolution ID images. In one embodiment, a portion of the captured image is specified, thereby allowing for adjustment of the resolutions of the object image and/or the ID image. Once the object images and one or more ID images are generated, an object group is generated as described above.

In another embodiment of an image capture device having sufficient image resolution, an object group is similarly generated from a single captured image. The high-resolution image of the object of interest is saved for future generation of an object group. Locations for the ID images are specified on the high-resolution object image, and a specified portion of the object image is processed to generate a close-up image, referred to herein as an ID image. Once the object image and one or more specified ID images are generated, an object group is generated as described above.

It should be emphasized that the above-described embodiments of the present invention, particularly, any "preferred" embodiments, are merely examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for identifying objects with captured images, the method comprising the steps of:
   actuating a controller configured to cause an image capture device to operate in a property identification (ID) mode;
   capturing an image of an object, thereby generating an object image when the image capture device is operating in the property ID mode; and
   capturing at least one high-resolution image of a unique feature of the object, thereby generating at least one identification (ID) image when the image capture device is operating in the property ID mode.

2. The method of claim 1, further comprising the step of associating the object image and the at least one ID image, thereby generating an object group such that the object group has a plurality of associated images that identify the object when the image capture device is operating in the property ID mode.

3. The method of claim 2, further comprising the steps of:
   storing the object image in a memory;
   storing the at least one ID image in the memory; and
   storing the object group in the memory.

4. The method of claim 3, further comprising the step of communicating the object image and the at least one ID image to a processing device.

5. The method of claim 3, further comprising the step of communicating the object group to a processing device.

6. The method of claim 1, wherein the image capture device comprises at least one selected from a group consisting of a digital camera, a facsimile (FAX) machine and a copy machine.

7. The method of claim 1, further comprising the step of formatting a plurality of selected images from the object group into a single image, wherein at least one of the selected images from the object group is the object image and wherein another one of the selected images from the object group is the ID image, such that a composite image is generated.

8. The method of claim 1, further comprising the steps of:
positioning a target icon over a selected location on the object image; and
defining a location of a selected ID image by associating the position of the target icon with the selected ID image.

9. The method of claim 8, further comprising the steps of:
generating a composite image having at least the object image and at least the selected ID image; and
generating a location pointer, the location pointer indicating the location of the selected ID image on the object image based upon the position of the target icon.

10. The method of 1, further comprising the steps of:
receiving the image of the object and the at least one high-resolution image of the unique feature from an image capture device; and
storing the image of the object and the at least one high-resolution image of the unique feature in the internal memory.

11. The method of claim 1, further comprising the step of generating a composite image by formatting a plurality of selected images from the object group into a single image, and wherein at least one of the selected images from the object group is the object image.

12. The method of claim 11, further comprising the step of displaying the composite image on a display.

13. The method of claim 11, further comprising the step of printing the composite image on a printing device.

14. The method of claim 11, further comprising the step of communicating the composite image to an external device.

15. A system which identifies objects with captured images, comprising:
a controller configured to cause an image capture device to operate in a property identification (ID) mode when the controller is actuated;
a photosensor residing in the image capture device and configured to capture an image of an object and at least one high-resolution image of a unique feature of the object; and
a memory configured to receive the captured image of the object, thereby generating an object image, and further configured to receive the at least one high-resolution image of the unique feature of the object, thereby generating at least one ID image, when the image capture device is operating in the property ID mode.

16. The system of claim 15, further comprising a processor residing in the image capture device and configured to associate the object image and the at least one ID image when the image capture device is operating in the property ID mode, thereby generating an object group such that the object group has a plurality of associated images that identify the object.

17. The system of claim 16, wherein the processor is further configured to generate a composite image having at least the object image and at least a selected ID image.

18. The system of claim 15, further comprising an interface configured to communicatively couple with a remote processing device such that the object image and the at least one ID image is communicated from the image capture device to the remote processing device.

19. The system of claim 15, further comprising a target icon displayed on the object image, the target icon configured to indicate the relative location of the ID image on the object.

20. The system of claim 19, wherein the processor is further configured to generate a composite image having at least the object image and at least a selected ID image, and further comprising a location pointer, the location pointer indicating the relative location of the selected ID image on the object image based upon the position of the target icon.

21. The system of claim 19, further comprising a second controller configured to position the target icon over a selected portion of the object image such that the relative location of the ID image on the object is defined.

22. The system of claim 21, wherein the controller and the second controller are implemented in a single interface control device.

23. The system of claim 15, further comprising a display and wherein the controller is implemented on a menu displayed on the display.

24. The system of claim 15, further comprising a processor configured to generate a composite image having at least the object image and at least a selected ID image.

25. The system of claim 24, wherein the processor is further configured to generate a composite image having at least the object image and at least a selected ID image, and further comprising a location pointer, the location pointer indicating the relative location of the selected ID image on the object image based upon the position of the target icon.

26. The system of claim 15, further comprising:
a display configured to display the object image; and
a target icon displayed on the object image, the target icon configured to indicate a relative location of the ID image on the object.

27. The system of claim 15, further comprising a second controller configured to position the target icon over a selected portion of the object image such that the relative location of the ID image on the object is defined.

28. The system of claim 27, wherein the second controller comprises at least one selected from a group consisting of a mouse, a track ball, a thumb ball, a palm ball and pointer stick.

29. The system of claim 15, further comprising means for displaying the object image.

30. The system of claim 15, further comprising means for generating a composite image.

* * * * *

UNITED STATES PATENT AND TRADEMARK OFFICE
CERTIFICATE OF CORRECTION

| | | |
|---|---|---|
| PATENT NO. | : 7,023,475 B2 | Page 1 of 1 |
| APPLICATION NO. | : 10/118564 | |
| DATED | : April 4, 2006 | |
| INVENTOR(S) | : Heather Noel Bean et al. | |

It is certified that error appears in the above-identified patent and that said Letters Patent is hereby corrected as shown below:

In column 8, line 47, after "of" delete "20".

In column 15, line 24, in Claim 10, delete "1" and insert -- claim 1 --, therefor.

Signed and Sealed this

Twenty-third Day of June, 2009

JOHN DOLL
*Acting Director of the United States Patent and Trademark Office*